W. S. TEMPLE.
AUTOMOBILE TIRE.
APPLICATION FILED SEPT. 28, 1910.
1,020,464.
Patented Mar. 19, 1912.
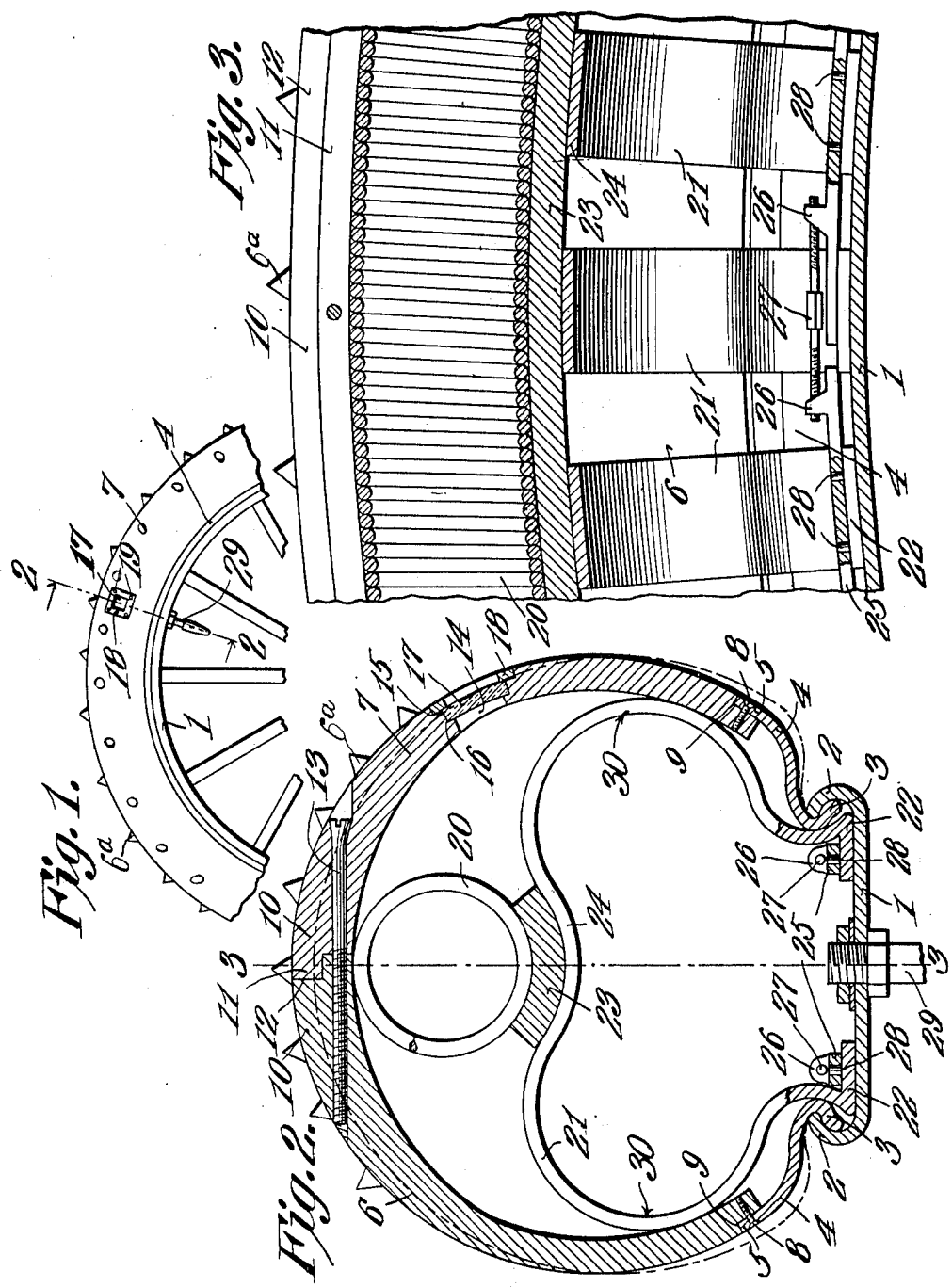
Winfield S. Temple Inventor
by C. A. Snow & Co.
Attorneys
Witnesses

UNITED STATES PATENT OFFICE.

WINFIELD SCOTT TEMPLE, OF SIDNEY, ILLINOIS.

AUTOMOBILE-TIRE.

1,020,464. Specification of Letters Patent. Patented Mar. 19, 1912.

Application filed September 28, 1910. Serial No. 584,347.

*To all whom it may concern:*

Be it known that I, WINFIELD SCOTT TEMPLE, a citizen of the United States, residing at Sidney, in the county of Champaign and State of Illinois, have invented a new and useful Automobile-Tire, of which the following is a specification.

It is the object of this invention to provide a vehicle tire the constituent elements of which are of novel form, and are united in a novel manner to afford resiliency to the tire.

In the drawings,—Figure 1 is a fragmental side elevation; Fig. 2 is a transverse section on the line 2—2 of Fig. 1; and Fig. 3 is a longitudinal section on the line 3—3 of Fig. 2.

In the drawings, the rim of the wheel is denoted by the numeral 1, the same being provided, in the present instance, with clencher flanges 2, adapted to engage the inner edges 3 of annular spring plates 4, reversely curved in cross section, as shown in Fig. 2. The outer edges 5 of the annular spring plates 4 are seated in recesses 9, formed in the outer faces of the tire sections 6 and 7, these tire sections being preferably fashioned from steel. The spring plates 4 are maintained in engagement with the tire casing sections 6 and 7, by means of screws 8, or other retaining elements adapted to a like end.

The tire casing sections 6 and 7 carry upon their outer surfaces, anti-slipping elements 6ª, of any desired construction. The adjacent, outer edges 10 of the tire sections 6 and 7 are scarfed together, as shown at 11—12. Securing elements, screws or the like, preferably, shown at 13, extend transversely through the tire sections 6 and 7, adjacent their curved portions.

Located within the tire casing sections 6 and 7, are a plurality of arched springs 21, disposed transversely of the wheel structure. The inner ends of the springs 21 are fashioned into feet 22, projecting toward each other, and adapted to rest upon the rim 1, the springs 21, adjacent the portions 22, bearing against the spring plates 4, to hold the same in engagement with the clencher flanges 2.

Extended circumferentially of the wheel and superposed upon the feet 22 of the springs 21 are bands 25, equipped adjacent their meeting ends, with lugs 26, adapted to receive turn buckles 27, whereby the bands may be clamped closely upon the feet 22 of the springs 21, to hold the springs in place upon the rim 1. Lugs 28, upstanding from the feet 22 of the springs 21, register in openings in the bands 25, the bands thus serving to hold the springs 21 against creeping movement circumferentially of the wheel.

The springs 21, in their outermost portions, bear yieldably against the tire casing sections 6 and 7, as shown at 30. In their intermediate portions, the springs 21 are depressed, as shown at 24 to receive a concaved band 23, supporting in its concavity a helical spring 20, bearing against the tire casing sections 6 and 7, adjacent the tread of the wheel.

In one of the tire casing sections, (in the section 7 in the present instance) there is a hole 14, consisting of portions 15 and 16, of different dimensions, defining a shoulder, against which rests a transparent plate 17, a frame 18 being superposed upon the plate 17, and screws 19, or other securing elements adapted to a like end, being employed for holding the frame 18 in place upon the section 7 of the tire. The interior of the tire casing structure is adapted to be partially filled with oil or other fluid, insertible through a valve 29 located in the rim 1, and the transparent plate 17 permits an inspection of the interior of the tire casing, to ascertain the degree of fluid inflation thereof.

The helical spring 20 and the springs 21 will yield and, as indicated in dotted lines on Fig. 2, the spring plates 4 will yield to some extent, the parts above mentioned cooperating to give the tire the required degree of resiliency.

Having thus described the invention what is claimed is:—

In a device of the class described, a rim; a tire casing thereon; and a resilient structure within the casing, said structure having a three-point engagement with the tire casing; the tire casing being out of engagement with said structure, saving at the engaged points; said structure embodying transversely arched springs, centrally depressed, and supported by the rim, a concavo-convex band resting in the depressed portions of the springs, and a helical spring resting in the band, the helical spring being of relatively small diameter, compared with the diameter of the tire casing; the transverse springs engaging the tire casing along its sides, and the helical spring engaging the tire casing along its tread.

In testimony that I claim the foregoing as my own, I have hereto affixed my signature in the presence of two witnesses.

WINFIELD SCOTT TEMPLE.

Witnesses:
J. BURT PORTERFIELD,
F. B. McELROY.

Copies of this patent may be obtained for five cents each, by addressing the "Commissioner of Patents, Washington, D. C."